United States Patent [19]
Aling

[11] 3,883,775
[45] May 13, 1975

[54] GAS DISCHARGE DISPLAY SYSTEM WITH CURRENT SUPPRESSION MEANS

[75] Inventor: Willem Aling, Emmasingel, Eindhoven, Netherlands

[73] Assignee: U.S. Philips Corporation, New York, N.Y.

[22] Filed: Dec. 6, 1973

[21] Appl. No.: 422,586

[30] Foreign Application Priority Data
  Jan. 8, 1973  Netherlands...................... 7300217

[52] U.S. Cl............. 315/84.6; 315/169 R; 315/119; 307/140
[51] Int. Cl.......................................... H01j 17/48
[58] Field of Search .......... 315/84.5, 84.6, 86, 119, 315/169 R, 169 TV; 307/140; 313/109.5

[56] References Cited
UNITED STATES PATENTS
3,307,171  2/1967  Claessen ........................... 315/84.6
3,373,313  3/1968  Prines et al. ........................ 315/175
3,794,881  2/1974  Janssen ........................... 315/169 R OTHER PUBLICATIONS
Burroughs Bulletin No. P102 (8 pages).

*Primary Examiner*—Stanley D. Miller, Jr.
*Attorney, Agent, or Firm*—Frank R. Trifari; Bernard Franzblau

[57] ABSTRACT

A gas discharge display device for capacitive control of an electrode system by output transistors of a control circuit in which the load impedances of the output transistors are current source circuits for the purpose of reducing the power output and/or in which the supply of the output transistor is switched off when there is no display information.

10 Claims, 1 Drawing Figure

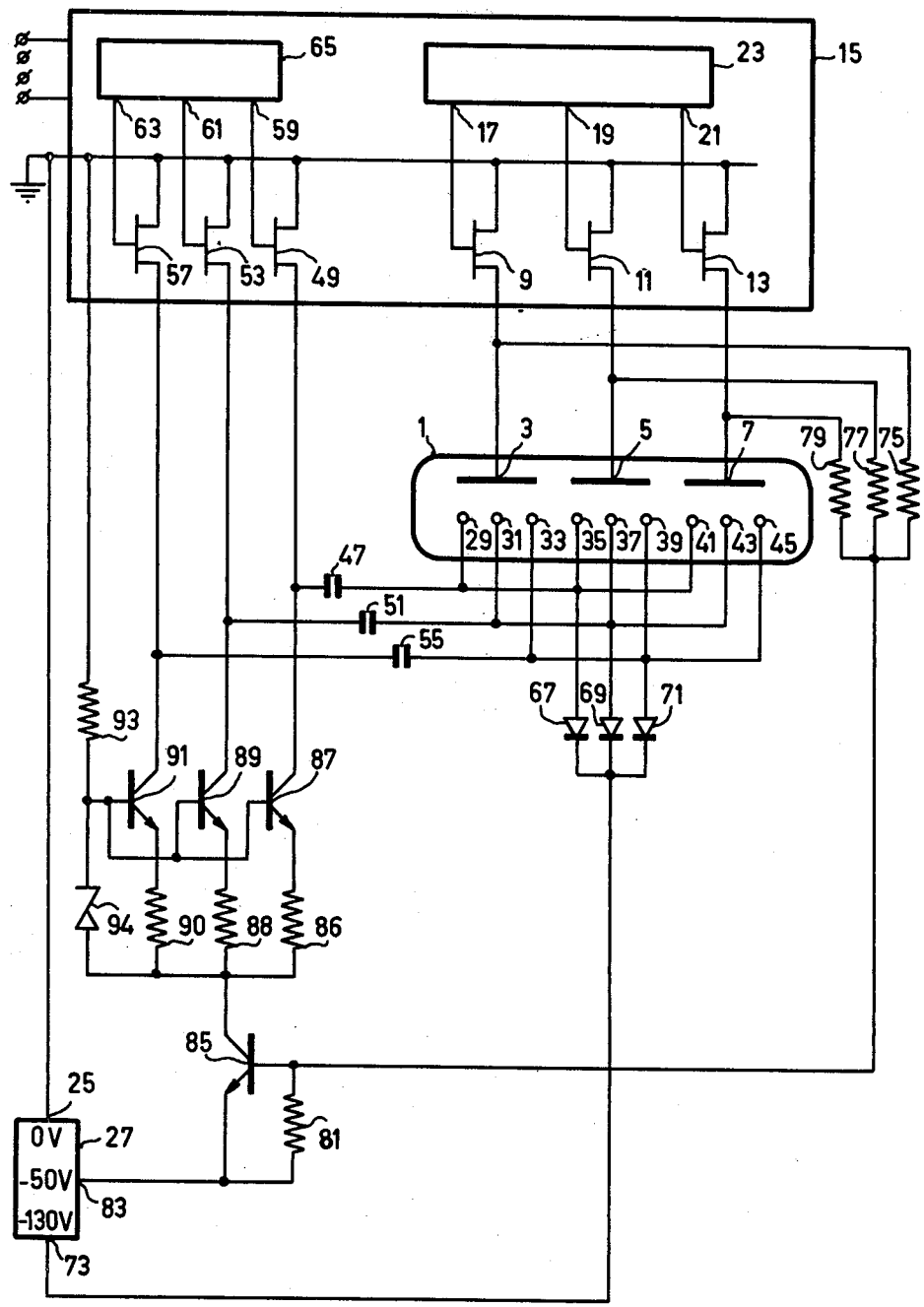

GAS DISCHARGE DISPLAY SYSTEM WITH CURRENT SUPPRESSION MEANS

The invention relates to a gas discharge display device comprising a first electrode system arranged in a discharge space and having a plurality of electrodes coupled to output electrodes of a first group of output transistors which are coupled to a first control circuit, further electrodes of said output transistors being connected to a supply source connection. The display device further comprises a second electrode system arranged in the discharge space and having a plurality of electrodes capacitively coupled to output electrodes of a second group of output transistors which are coupled to a second control circuit and further electrodes of which are connected to a point of substantially the same potential as the said supply source connection. The display device also includes a switch coupled to the first control circuit for suppressing the current through the display device when the electrodes of the first electrode system are not energized. The switch is coupled to the output electrodes of the output transistors of the second transistor group. The output electrodes of the second group of output transistors are also connected through a load impedance to a further connection of the supply source.

A gas discharge display device of the kind described above in known from Burroughs Bulletin P 102, page 6, FIG. 5. The capacitive coupling of the electrodes of the second electrodes system to the output transistors of the second group makes it possible that the output transistors of the first and second groups are incorporated in one and the same integrated circuit because they can be fed with supply voltages which are the same or which are slightly different from each other. The switch suppresses the current through the display device by bringing the connection of the output electrodes of the second group of output transistors to the potential of the said supply source connection.

An object of the invention is to provide a display device which is more suitable for use in portable apparatus.

To this end a gas discharge display device of the kind described in the preamble according to the invention is characterized in that the switch is incorporated in the connection between the load impedance and the further connection of the supply source.

Due to the step according to the invention an economy in the energy consumption by the display device is obtained which is of great importance for portable sets.

The invention will now be described with reference to the drawing. The drawing has a single FIGURE showing a diagram of a gas discharge display device according to the invention.

In the gas discharge display device of the FIGURE a gas discharge display tube 1 has a discharge space with a first electrode system 3,5,7, in this case anodes, each of which is connected to an output electrode of a MOS transistor of a first group of output transistors 9, 11, 13 of an integrated circuit 15 ensuring periodic energization. The gate electrodes of the output transistors 9, 11, 13 are connected to outputs 17, 19, 21 of a first control circuit 23. The further electrodes of the transistors 9, 11, 13 are connected to a suuply connection 25 for a supply source 27 which is in this case connected to ground potential (OV).

Facing each anode 3,5,7 of the display tube 1 is a plurality of electrodes of a second electrode system 29, 31, 33; 35, 37, 39; 41, 43, 45 which in this case are cathodes. The cathodes 29, 35 and 41 are interconnected, for example, due to the structure of the display tube 1, and are connected through a capacitor 47 to an output electrode of a MOS output transistor 49. In the same manner the cathodes 31, 37, 43 are connected through a capacitor 51 to an output electrode of a MOS output transistor 53 and the cathode 33, 39, 45 are connected through a capacitor 55 to an output electrode of a MOS output transistor 57. The output transistors 49, 53, 57 constitute a second group whose gate electrodes are controlled through outputs 59, 61, 63 of a second control circuit 65. Their further electrodes are connected to the same supply connection as those of the first group.

The cathodes 29, 35, 41 are furthermore connected through a diode 67, the cathodes 31, 37, 43 are connected through a diode 69 and the cathodes 33, 39, 45 are connected through a diode 71 to a supply connection 73 of the supply source 27 which can supply a voltage of $-130$ V.

Three resistors 75, 77, 79 are connected to the anodes 3, 5, 7 of the display tube 1 and their other ends are connected through a resistor 81 to a connection 83 of the supply source 27 which can supply a voltage of $-50$ V. The base-emitter junction of an npn-transistor 85, serving as a switch, is connected in parallel with the resistor 81, said transistor conducting when at least one of the anodes 3, 5, 7 is at a higher potential and being cut off when this is not the case.

The collector of the transistor 85 is connected through three resistors 86, 88, 90 to the emitters of three npn transistors 87, 89, 91 serving as current sources whose collectors are connected to the output electrodes of the output transistors 49, 53, 57 of the second group and serve as a load impedance therefor. The bases of the transistors 87, 89, 91 are interconnected and are connected through a potential divider including a resistor 93 and a Zener diode 94 between the 0 V supply connection 25 of the supply source 27 and the collector of the transistor 85. The current source properties of the transistors 87, 89, 91 are obtained in this case by the emitter resistors 86, 88, 90 and the supply of the bases through the potential divider 93, 94.

The operation of the switch is as follows: When a cathode facing an anode is to light up, for example, the cathode 29 facing the anode 3, the relevant output transistor 9 is rendered conducting and the output transistor 49 is cut off by the first and second control circuits 23 and 65, respectively.

The transistor 85 starts to conduct due to the great potential difference between the anode 3 and the connection 83 of the supply source 27 so that the transistor 87 also starts to conduct because its emitter is then substantially at $-50$ V and its base is connected to the potential divider constituted by the resistor 93 and the Zener diode 94. Consequently a sudden voltage drop occurs at the collector of the transistor 87 which is transferred through the capacitor 47 to the cathode 29 so that a discharge path to the anode 3 is produced causing the cathode 29 to light up. The diode 67 is then blocked and the current through the gas discharge is supplied via the transistor 87. This current causes the voltage at the collector of the transistor to decrease but the current remains substantially constant as long as the gas discharge path between the cathode 29 and the anode 3 remains ignited. This current should be, for example, 1 milli-ampere for a satisfactory light output from the cathode 29. If a resistor was used instead of the transistor 87, its value would have to be approximately 10 k. Ohm to obtain a current intensity of 1 milli-ampere. The transistors 53 and 57, which must keep the cathodes 31 and 33 at such a potential that they cannot produce a gas discharge, then conduct and a voltage of substantially 50 volts is present across the transistors 89 and 91. When instead of the transistors 89 and 91 resistors of 10 k. ohms were used, a current of approximately 5 milli-ampere would have flowed through these resistors. By using a transistor instead of a resistor so that also in case of a larger voltage drop the current always remains 1 milli-ampere the power dissipated by the transistors 89 and 91 for each cathode which is not energized is thus greatly reduced.

To extinguish the gas discharge path between the cathode 29 and the anode 3, the output transistor 9 of the first control circuit 23 is cut off and the output transistor 49 of the second control circuit is rendered conducting. The voltage at the anode 3 will sharply decrease due to the resistor 75 and the voltage at the cathode 29 will increase as a result of the output transistor 49 becoming conducting. The value of the voltage step caused by this increase is dependent on the charge reduction occurring at the capacitor 47 when the cathode 29 lights up and will cause the diode 67 to conduct so that the charge at the capacitor 47 is brought to a value desired for a subsequent ignition while the voltage across the capacitor 47 is then 130 V again.

When none of the output transistors 9, 11, 13 is rendered conducting for some time, the voltage at the anodes 3, 5, 7 will remain low and the transistor 85 will be cut off so that the current to the output transistors 49, 53, 57 is interrupted resulting in a very large economy in the current consumption of the circuit arrangement. Thus a current only flows through the output transistors 49, 53, 57 when a relevant anode is actually energized.

It will be evident that a circuit arrangement according to the invention may also be used when exchanging the anode and cathode functions of the display tube 1. If desired, the gas discharge display tube 1 may have more than one discharge space or may even consist of a plurality of separate parts. It may be a tube having an array of, for example, segments or dots. Futhermore the groups of output transistors may be connected, if desired, to a slightly different voltage.

What is claimed is:

1. A gas discharge display device comprising first and second groups of output transistors, first and second control circuits coupled to said first and second groups of output transistors, respectively, for controlling the conduction in said output transistors, a gas discharge display tube comprising a first electrode system arranged in a discharge space of the tube and having a plurality of electrodes coupled to output electrodes of the first group of output transistors, means connecting further electrodes of said first group of output transistors to a terminal of an electric supply source, capacitance means, said display tube including a second electrode system arranged in the tube discharge space and having a plurality of electrodes capacitively coupled via said capacitance means to output electrodes of the second group of output transistors, means connecting further electrodes of said second group of output transistors to a point of substantially the same potential as the said supply source terminal, a switch coupled to the first control circuit for suppressing the current through the display device when the elctrodes of the first electrode system are not energized, and means for coupling the output electrodes of the second group of output transistors through a load impedance means and said switch to a further terminal of the supply source.

2. A gas discharge display device as claimed in claim 1 wherein the load impedance means comprises a plurality of current sources.

3. A display device as claimed in claim 1 wherein said coupling means is arranged to connect the load impedance means and the switch in series between the output electrodes of the second group of transistors and the further terminal of the supply source.

4. A display system comprising, a gas discharge display tube having first and second electrode systems comprising a first and a second plurality of electrodes, respectively, first and second groups of output transistors, first and second control means coupled to said first and second groups of output transistors, respectively, for controlling the conduction in said first and second groups of output transistors, first and second terminals for supplying operating voltages to the display tube, means individually connecting the first plurality of tube electrodes to output electrodes of the first group of transistors, means connecting further electrodes of said first group of output transistors to the first supply terminal, capacitor means, means including said capacitor means for coupling the second plurality of tube electrodes to output electrodes of the second group of output transistors, means connecting further electrodes of said second group of output transistors to a voltage substantially the same as that of the first voltage supply terminal, a controlled switch for suppressing the current through the display device when the electrodes of the first electrode system are deenergized and including a control electrode coupled to the first electrode system, load impedance means, and means for coupling the output electrodes of the second group of output transistors through said load impedance means and said controlled switch to the second voltage supply terminal.

5. A display system as claimed in claim 4 further comprising diode means coupling the electrodes of the second electrode system to a third operating voltage supply terminal of the system.

6. A display system as claimed in claim 4 wherein said load impedance means comprises a plurality of transistors connected to operate as current sources and connected in series with the controlled switch to the second voltage supply terminal and individually connected to the output electrodes of the second group of output transistors.

7. A display system as claimed in claim 6 wherein said capacitor means comprises a plurality of capacitors connected between the electrodes of the second electrode system and the junction points formed between the output electrodes of the second group of output transistors and the current source transistors.

8. A display system as claimed in claim 4 wherein the control electrode of the controlled switch is connected to the first control means via said first group of output transistors.

9. A display system as claimed in claim 4 wherein said further electrodes of the second group of output transistors are connected to said first voltage supply terminal.

10. A display system as claimed in claim 4 wherein said coupling means is arranged to connect said load impedance means and said controlled switch in series between the output electrodes of the second group of transistors and said second voltage supply terminal, and said control electrode is responsive to the voltage at said first electrode system to turn on the controlled switch if at least one of the electrodes of the first electrode system is energized with a display voltage.

* * * * *